United States Patent [19]

Barriquand et al.

[11] Patent Number: 4,516,413
[45] Date of Patent: May 14, 1985

[54] MACHINES FOR THE LIQUID OR GASEOUS TREATMENT OF TEXTILE MATERIAL OR OTHER FIBROUS OR POROUS MATERIALS

[75] Inventors: Robert Barriquand; Bernard Barriquand; Bernard Durantet; Bernard Machabert, all of Roanne, France

[73] Assignee: Barriquand, Roanne, France

[21] Appl. No.: 648,352

[22] Filed: Sep. 7, 1984

Related U.S. Application Data

[63] Continuation of Ser. No. 349,997, Feb. 18, 1982, abandoned.

[30] Foreign Application Priority Data

Mar. 5, 1981 [FR] France ............................... 81 04401

[51] Int. Cl.³ ............................................. D06B 5/18
[52] U.S. Cl. ............................................ 68/5 C; 68/7; 68/15; 68/189; 68/195
[58] Field of Search ................... 68/15, 184, 187, 188, 68/189, 195, 5 C, 7

[56] References Cited

U.S. PATENT DOCUMENTS 1,393,641 10/1921 Richardson ............................. 68/15
3,479,846 11/1969 Walsom ............................... 68/15 X
3,967,923  7/1976 Ameling ............................... 8/149.1

FOREIGN PATENT DOCUMENTS

| 309974 | 12/1918 | Fed. Rep. of Germany | 68/195 |
| 2451829 | 5/1976 | Fed. Rep. of Germany | . |
| 2456208 | 8/1976 | Fed. Rep. of Germany | 68/189 |
| 2253865 | 7/1975 | France | . |
| 2283976 | 4/1976 | France | . |
| 2429283 | 2/1980 | France | 68/189 |
| 2444741 | 7/1980 | France | . |
| 514045 | 2/1955 | Italy | 68/189 |
| 170956 | 11/1921 | United Kingdom | 68/189 |
| 217758 | 6/1924 | United Kingdom | 68/187 |
| 210765 | 9/1924 | United Kingdom | 68/189 |

Primary Examiner—Philip R. Coe
Attorney, Agent, or Firm—Browdy and Neimark

[57] ABSTRACT

A machine is provided for the liquid or gaseous treatment of textile or other materials having a material carrier and comprising, in a lower part thereof, a false bottom in which is formed a housing adapted to receive a heat exchanger, the false bottom defining a space or compartment with the bottom of the machine. A pipe having a vertical axis is mounted at the base of the machine, substantially in the axis of the latter. The space may be either isolated from the rest of the machine, or placed in communication with the upper part thereof through external or internal ducts, and inert bodies may be provided in the machine.

20 Claims, 9 Drawing Figures

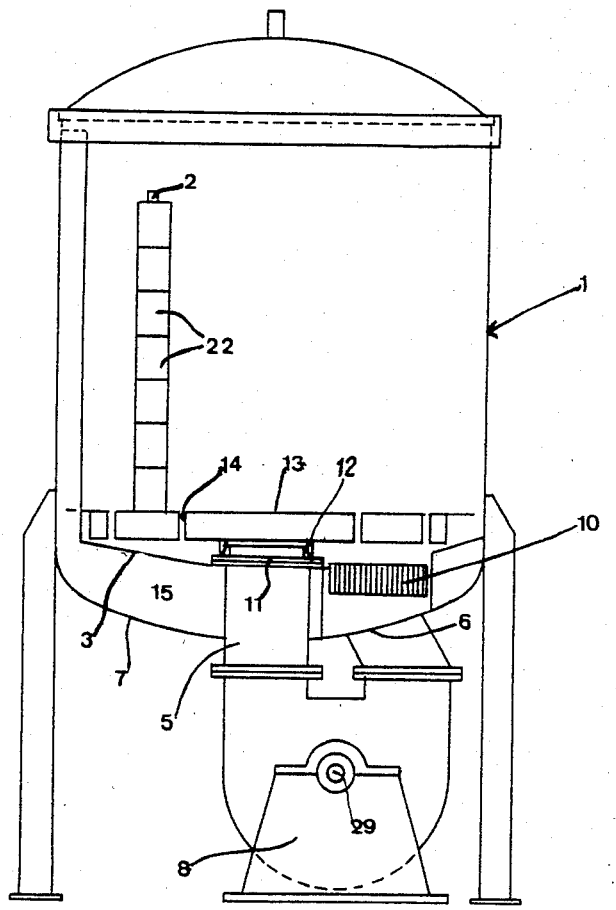
FIG. 1
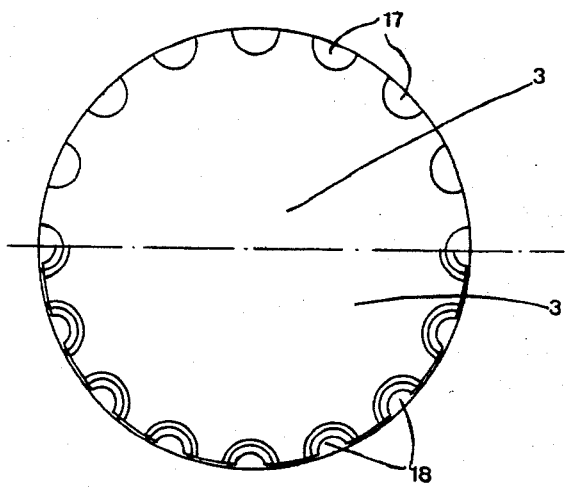
FIG. 2A
FIG. 2B

MACHINES FOR THE LIQUID OR GASEOUS TREATMENT OF TEXTILE MATERIAL OR OTHER FIBROUS OR POROUS MATERIALS

This application is a continuation of application Ser. No. 349,997, filed 02/18/82, now abandoned.

BACKGROUND OF THE INVENTION

The present invention relates to an improved machine for liquid treatment (water, solvents etc . . . ) or gaseous treatment (foam, for example) of textile materials and particularly for washing, dyeing and bleaching textile materials, not only textile materials before spinning—in the form of fluff—but also textile materials during spinning—combed tops, for example—and materials after spinning, in the form of yarn or after weaving or knitting, as well as the processing of fibrous or porous materials for the paper-making industry, particularly.

Machines are known for washing, dyeing and bleaching textile materials at a high temperature going up to 140° C., in which the treatments are effected by causing the bath to flow through the static textile material. These machines are designed either to treat the immersed textile material, with flow of the bath in both directions, or for treating the non immersed textile material, with a bath level under the material carrier and a very short bath ratio. In these machines, the free inner space which is above the textile material immersed or not is filled with a gas cushion, such as nitrogen or compressed air, which is maintained at a constant adjustable pressure whose value is greater than the vapor tension at the treatment temperature at every point of the autoclave.

Although the technical performances of these machines are very good, it proves necessary to further improve them by reducing as much as possible the volume of the treatment bath in circulation and consequently the consumption of energy.

SUMMARY OF THE INVENTION

The present invention has consequently as its aim to provide a machine for treating textile materials or other fibrous or porous materials, in a gas or liquid medium, such as washing, dyeing and bleaching which answers better the requirements of practice than the machines of the same type proposed in the prior art, in that it permits a considerable reduction in the energy consumed by this type of machine, related to a reduction of the volume of the treatment bath in circulation resulting from improvements made to these machines.

The present invention provides a machine for the liquid or gas treatment of textile materials or other fibrous or porous materials and particularly for washing, dyeing and bleaching textile materials, which is equipped with a material carrier and which is characterized in that it is equipped in its lower part with a false bottom whose positioning in the machine provides an appreciable reduction of the proportion of bath circulating therein and consequently results in economies in water, energy etc.

According to an advantageous embodiment of the invention, the false bottom comprises a housing adapted for receiving a heat exchanger. According to another advantageous embodiment of the invention, the machine is connected to a pipe with vertical axis mounted substantially in the axis of the machine and it comprises an opening provided in the bottom, at the level of the spherical cover, in the vicinity of said pipe, this latter ensuring with said opening the communication between the inner enclosure of the treatment machine and an external reversible pump, preferably with horizontal axis, situated under the autoclave and adapted to cause the bath to flow either in the direction going from said opening to said pipe or in the opposite direction.

In accordance with another advantageous embodiment of the invention, the machine is equipped with a device for receiving the material carriers, situated in the upper part of said axial pipe, in a horizontal plane situated substantially above the cross-section radius of the machine.

In accordance with the invention, inert bodies are provided in the material carriers for occupying all the dead spaces situated between the piles of material to be treated carried by the material carriers, thus further reducing the inner volume of the machine and consequently the volume of the bath in circulation.

According to an advantageous arrangement of this embodiment, the inert bodies are integral with the material carriers.

According to an advantageous embodiment of the invention, the false bottom is formed by an inner metal wall which comprises an axial opening adapted to receive the upper end of an axial pipe and a second opening adapted to house therein the heat exchanger, provided substantially in the axis of the opening formed in the lower spherical cover of the machine to provide communication with the external pump.

According to another advantageous arrangement of the invention, the inner wall which forms the false bottom is either substantially horizontal, or slightly inclined along a descending slope from the wall of the machine towards the axial pipe.

According to yet another advantageous arrangement of the invention, the space between the bottom of the machine, the false bottom and the axial pipe is completely isolated from the rest of the machine.

According to a variation of this arrangement, the space between the bottom of the machine, the false bottom and the pipe is placed in communication with the upper part of the machine through inner or outer ducts.

In accordance with the invention, in the variation in which the communication between the upper part of the machine and the space between the bottom thereof, the false bottom and the axial pipe is provided by means of inner ducts, these latter may be, as well as the false bottom, fixed, in which case they are advantageously fixed to the inner wall of the machine.

Also in accordance with the invention, said inner ducts may be removable, whereas the false bottom is fixed or else they may be removable, as well as the false bottom. In this latter case, it is advantageous in accordance with the invention to fix rigidly together the false bottom and the inner ducts.

According to an advantageous arrangement of the invention, the inert bodies provided between the material carriers are integral not with these latter but with the false bottom, which presents an important advantage in the case of a removable false bottom integral with inner ducts for communication with the upper part of the machine, also removable, considering that there may be positioned in the machine a solid false bottom/inner duct/inert body assembly for the treatment of materials on a given type of material carrier and that it may be removed to be replaced by another assembly, also removable, adapted to types of material carriers of different dimensions having, for example, reels of a different diameter from those able to be carried by the preceding type of material carrier.

Also in accordance with the invention, the boxes for distributing the treatment bath associated with the material carriers are provided with perforations which ensure a more rapid return of the bath to the bottom of the machine and the resultant more rapid taking up thereof by the pump.

Besides the preceding arrangements, the invention further comprises other arrangements which will become clear from the following description.

The present invention relates more particularly to machines for the liquid or gas treatment of textile materials or other fibrous or porous materials, in accordance with the preceding arrangements, as well as the means adapted to their construction and implementation and the processes for the liquid or gaseous treatment of these materials using such machines.

BRIEF DESCRIPTION OF THE DRAWINGS

The invention will be better understood from the complement of description which follows which refers to the accompanying drawings in which:

FIG. 1 is a schematical view in longitudinal section of one embodiment of the machine for treating textile or other materials in accordance with the invention;

FIG. 2 is a schematical view of the upper face of the false bottom in accordance with the invention, with inner ducts which provide communication between the space defined by the bottom of the machine and the false bottom and the upper part of the machine, and more particularly:

FIG. 2A shows fixed inner ducts, and

FIG. 2B shows removable inner ducts,

Figure 3:
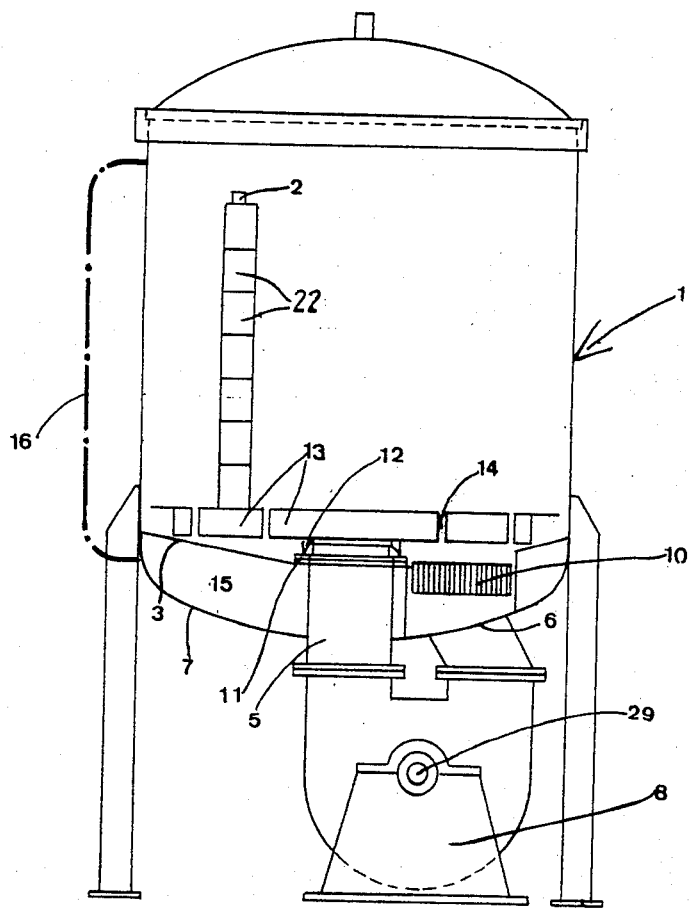
FIG. 3 is a schematical view in longitudinal section similar to that of FIG. 1, with external ducts for communication between the space defined by the bottom of the machine and the false bottom, and the upper part of the machine.

It should of course be understood however that these drawings and the corresponding descriptive parts are given solely by way of illustration of the subject of the invention of which they in no wise form a limitation.

DESCRIPTION OF THE PREFERRED EMBODIMENTS

The machine for the liquid or gaseous treatment of textile materials or other fibrous or porous materials, in accordance with the invention, is formed by an autoclave designated generally by the reference 1, for the static treatment of textile or other materials, carried by material carriers 2, by circulation of a treatment bath. This machine comprises a false bottom 3, preferably made from metal, which comprises an axial opening 4 for receiving the upper end of a pipe 5 having a vertical axis. A lateral opening 6 is formed in the bottom of the machine at the level of the spherical cover 7 of this latter. The axial pipe 5 and opening 6 are connected to an external pump 8 with horizontal axis situated under the autoclave 1, to provide communication between said pump and the inner enclosure of the autoclave and circulation of the treatment bath. Pump 8 is any appropriate type and may, more particularly, be a reversible helico-centrifugal pump, actuated by a variable speed motor 29, which may cause the bath to flow either in the direction going from opening 6 towards pipe 5, or in the opposite direction, or a centrifugal pump fitted with a reversing valve system, or any other pump adapted to ensure the desired flow of the treatment bath in the machine.

The false bottom 3 comprises further an opening 9 formed substantially in the axis of opening 6 provided in the bottom 7 of autoclave 1, designed for receiving a heat exchanger 10 of any suitable type, and more particularly a compact welded heat exchanger.

The base 11 integral with pipe 5 supports a cone 12 for receiving material carriers 2 in which the treatment bath is distributed by means of a bath distributing box 13 in which are provided perforations 14 for the rapid return of the bath to the bottom of autoclave 1, to be taken up again by pump 8.

The part of the autoclave defined by the false bottom 3, bottom 7 and pipe 5, which will be designated hereafter by the reference 15, may be completely isolated from the rest of the autoclave, as suggested by FIG. 1.

Space 15 may also be placed in communication with the upper part of the autoclave, either through one or more outer ducts 16, as shown in FIG. 3 or by one or more inner ducts. These inner ducts may be either non removable ducts 17, fixed to the inner wall of the autoclave (see FIG. 2A), or removable ducts 18 (see FIG. 2B). The false bottom may be either fixed, as shown in FIGS. 1 to 4, or removable as shown in FIGS. 5 to 8.

The drainage of condensation which is likely to form in space 15 is provided by any appropriate means such as a valve, for example.

The provision of a false bottom is particularly advantageous in the case where the inner ducts providing the communication between space 15 and the upper part of the autoclave are removable ducts, for it allows said inner ducts to be rigidly secured to the false bottom and to form thus a removable assembly whose dimensions are adapted to the dimensions of the different types of material carriers likely to be used in the autoclave 1, i.e. for example adapted to the different diameters of reels 22 of textile materials to be treated stacked on the material carriers 2.

Figure 5:
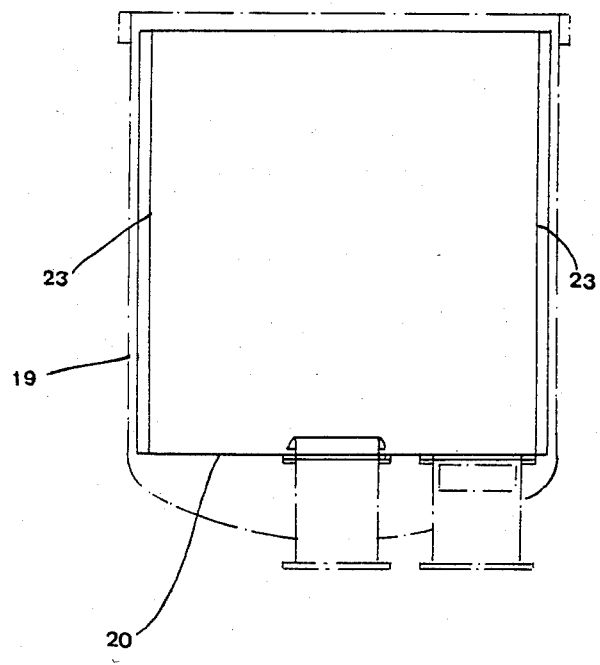
FIG. 5 is a schematical view in longitudinal section of an embodiment of the machine in which the false bottom and the inner ducts are integral and removable.
Figure 7:
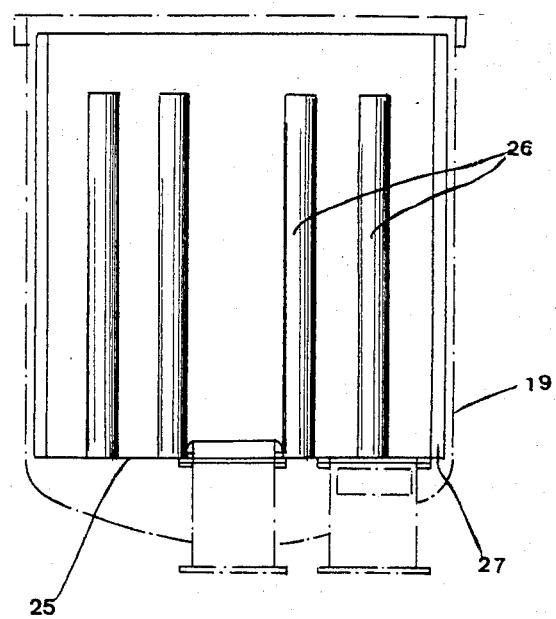
FIG. 7 is a schematical view in longitudinal section of an embodiment of the machine in which the false bottom, the inner ducts and the inert bodies are rigidly locked together and removable.
Figure 6:
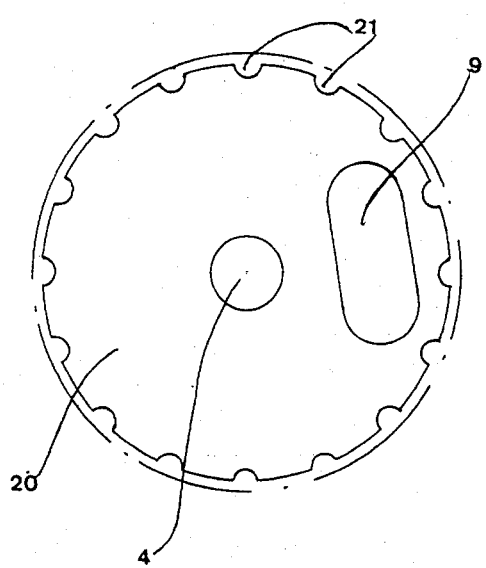
FIG. 6 is a view of the false bottom of the machine shown in FIG. 5.
Figure 8:
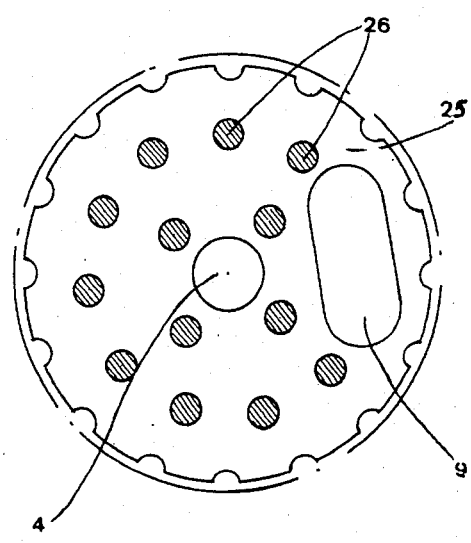
FIG. 8 is a view of the false bottom of the machine shown in FIG. 7.

Another embodiment is shown in FIGS. 5 and 6 where the autoclave 19 is fitted with a removable false bottom 20 having an axial opening 4 for receiving the upper end of pipe 5 and a lateral opening 9 for receiving a heat exchanger. False bottom 20 comprises at its periphery housings 21 for receiving inner ducts 23 which are made integral with false bottom 20. When, for the treatment of different diameters of textile material reels, the material carriers are changed, it is then possible to withdraw from autoclave 19 the removable assembly 20-21 so as to replace it by another false bottom 20-duct 21 assembly having dimensions adapted to those of the new material carriers positioned in the autoclave. The inner ducts open above the upper part of the material carriers, so that, even when the level of the bath in the apparatus is substantially above the upper part of the material carriers 2, the upper end of the ducts, whether they are internal or external, are situated above the level of the bath. The result is that the space 15 is placed in communication with the gaseous atmosphere which overlies the bath, the result of which is to ensure the equality of the respective pressures of the gaseous atmosphere in space 15 and of the gaseous atmosphere which overlies the bath.

The internal ducts contribute to eliminating the dead spaces between the reels situated at the periphery of the material carrier and in thus further reducing the proportion of bath. The internal or external ducts may also serve for continuous rinsing at high level of the textile material when this latter is immersed.

The provision of a false bottom, removable or not, in the autoclave allows practically all the dead spaces at the base of the autoclave, not directly usable for the treatment to be eliminated and so the volume of the treatment bath to be reduced to just that which is necessary for the treatment. However, it is possible to further reduce the volume of the bath by equipping the autoclave with vertical inert bodies which occupy the dead zones between textile material stacks 22 to be treated carried by adjacent material carriers 2.

Figure 4:
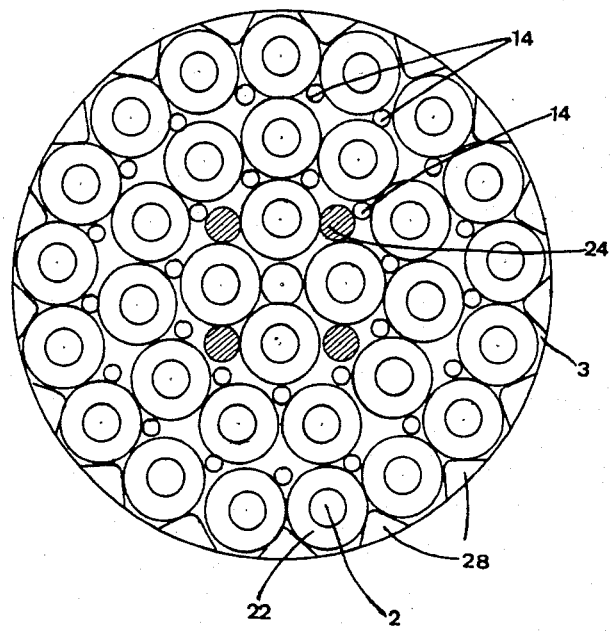
FIG. 4 is a schematical view in cross section showing the relative disposition of the false bottom, the material carriers, the inert bodies and the bath return perforations.

According to an advantageous embodiment of the invention, these inert bodies 24 are integral with the material carriers 2 (see FIG. 4). According to another advantageous embodiment of the invention, the inert bodies 26 are integral with the false bottom 25, which is also integral with the internal ducts 27: thus a removable integral assembly is obtained 25–26–27 replacable by another similar integral assembly whose dimensions are adapted to the type of material carriers used for treating different textile materials.

It should be noted that reference 28 in FIG. 4 designates either internal ducts associated with a false bottom 3, or peripheral inert bodies which further reduce the dead spaces in the autoclave and thus allow the volume of bath for the treatment to be further reduced.

With the combination of false bottom, inert bodies and ducts, more especially internal ducts, there is obtained a machine for the liquid or gaseoue treatment of textile materials, or other fibrous or porous materials, in which the volume, or proportion, of bath required for the treatment is considerably reduced in comparison with the machines known in the prior art, this reduction implying an economy in water and an economy in energy which results from the reduction of the quantities of water required for the treatment and improved productivity. Furthermore, the polluting waste (chemical products, dye materials) is reduced consequently representing an appreciable reduction in the pollution of the environment. Furthermore, the particular arrangement of the pump results in optimizing the performances thereof and in reducing the consumption of energy for operating the pump, taking into account the circuit of the treatment bath. Experiments carried out by the Applicant have shown that with the machine of the invention economies in water and energy of 20 to 30% may be achieved with respect to the best performing machines having the same purpose.

As follows from what has gone before, the invention is in no wise limited to those of its embodiments and modes of application which have just been described more explicitly: it embraces, on the contrary, all variations thereof which may occur to a man skilled in the art, without departing from the scope or spirit of the present invention.

What is claimed is:

1. A machine for treating textile materials or other fibrous or porous materials with a liquid or gaseous treatment bath, and more particularly for washing, dyeing and bleaching such material, said machine comprising:
    a container;
    a false bottom disposed in, and extending across a lower part of, said container;
    a first pipe mounted in said container and being vertically disposed, one end of said pipe extending through the bottom of said container and said false bottom;
    a second pipe mounted in said container and extending through the bottom of said container and said false bottom;
    said false bottom being imperforate except for first and second openings for receiving said first and second pipes, respectively;
    said false bottom defining in combination with the bottom of said container a compartment which is fluid-tight with respect to said treatment bath in the container above said false bottom, said false bottom further defining means for reducing the volume of bath circulating within said container;
    said first and second pipes being sealed in said false bottom to maintain the integrity of isolation of said compartment from the treatment bath above said false bottom;
    a reversible pump means interconnecting, and communicating with, said first and second pipes, said pump means being disposed externally of said container and being capable of causing the treatment bath to flow in either direction through said first and second pipes; and
    a material carrier mounted on the end of said first pipe extending above said false bottom.

2. The machine as claimed in claim 1, wherein said second opening comprises a housing adapted to receive a heat exchanger.

3. The machine as claimed in claim 1, wherein said first pipe includes means for mounting said material carrier on said first pipe one end in a horizontal plane.

4. The machine as claimed in claim 1, wherein said materials are supported on said material carrier, and inert bodies are disposed between the materials so as to occupy all dead zones situated between the materials to be treated.

5. The machine as claimed in claim 4, wherein said inert bodies are integral with said material carrier.

6. The machine as claimed in claim 4, wherein said inert bodies are integral with said false bottom.

7. The machine of claim 4 wherein said inert bodies comprise longitudinal axes, and said axes are disposed normal to said horizontal plane.

8. The machine as claimed in claim 1, including a heat exchanger housed in said second opening, said heat exchanger communicating with said external pump.

9. The machine as claimed in claim 1, wherein said false bottom is substantially horizontal.

10. The machine as claimed in claim 1, wherein said false bottom is slightly inclined along a descending slope from the wall of the container towards said first pipe.

11. The machine as claimed in claim 1, wherein said compartment is completely isolated from the rest of said container.

12. The machine as claimed in claim 1, and further including ducts disposed externally of said compartment, said ducts communicating said compartment with the upper part of said container.

13. The machine as claimed in claim 1, wherein said container includes ducts therein, said ducts communicating the upper part of said container with said compartment.

14. The machine as claimed in claim 13, wherein said ducts are not removable from, and fixed to the inner wall of, said container.

15. The machine as claimed in claim 13, wherein said ducts are removable.

16. The machine as claimed in claim 15, wherein said false bottom is removable from said container, and said removable ducts are integral with said false bottom.

17. The machine as claimed in claim 16 further including inert bodies integral with said false bottom, wherein said inert bodies are disposed between the materials so as to occupy all dead zones situated between the materials to be treated.

18. The machine as claimed in claim 12, 13 or 16, wherein said ducts open at their upper ends into a gaseous atmosphere which overlies the bath, said ducts permitting equalization between the respective pressures of the gaseous atmosphere in the compartment and of the gaseous atmosphere which overlies the treatment bath.

19. The machine as claimed in claim 18, wherein said material carrier includes means for distributing the treatment bath, said distributing means having perforations to ensure a more rapid return of the bath to said pump.

20. The machine as claimed in claim 1, wherein said false bottom is fixed to said container.

* * * * *